United States Patent

Ashida et al.

[11] Patent Number: 4,752,151
[45] Date of Patent: Jun. 21, 1988

[54] COUPLING DEVICE FOR FORCE TRANSMITTING MEMBER

[75] Inventors: Masanobu Ashida, Kawasaki; Seiichi Koyama, Kashimamachi; Kiyoshi Shirakawa, Omigawamachi; Toshiyuki Tamaki, Yamato; Akira Yamazaki, deceased, late of Kananishi, all of Japan, by Shizue Yamazaki, heir

[73] Assignee: Denki Kagaku Kogyo Kabushiki Kaisha, Tokyo, Japan

[21] Appl. No.: 847,803

[22] Filed: Apr. 3, 1986

[30] Foreign Application Priority Data

Apr. 3, 1985 [JP] Japan .................. 60-69086
May 16, 1985 [JP] Japan ................. 60-102682

[51] Int. Cl.⁴ .................. B25G 3/34; F16B 11/00
[52] U.S. Cl. .................. 403/267; 403/266; 403/307
[58] Field of Search .............. 403/265, 266, 267, 268, 403/269, 285, 300, 307

[56] References Cited

U.S. PATENT DOCUMENTS

| | | | |
|---|---|---|---|
| 1,656,797 | 1/1928 | Scott | 403/266 |
| 1,689,281 | 10/1928 | Forssell | 403/265 |
| 2,650,943 | 9/1953 | Leuchs et al. | 403/265 X |
| 2,652,231 | 9/1953 | Smith | 403/268 X |
| 3,536,460 | 10/1970 | Voelker | 403/267 X |
| 3,540,763 | 11/1970 | Alfred | 403/265 |
| 3,552,787 | 1/1971 | Yee | 403/265 |
| 3,638,978 | 2/1972 | Guntermann | 403/267 |
| 4,095,389 | 6/1978 | Outram et al. | 403/268 X |
| 4,143,986 | 3/1979 | Antosh | 403/307 |

FOREIGN PATENT DOCUMENTS

| | | | |
|---|---|---|---|
| 321163 | 10/1929 | United Kingdom | 403/267 |
| 1546253 | 5/1979 | United Kingdom | 403/307 |

OTHER PUBLICATIONS

The Sleeve Method of Splicing Deformed Reinforcing Bars, Technical Information; ESPLICE.

*Primary Examiner*—Andrew V. Kundrat
*Attorney, Agent, or Firm*—Jordan and Hamburg

[57] ABSTRACT

According to the invention, a coupling device for a force transmitting member is provided. The coupling device contains a plurality of force transmitting members and a joint for coupling each end of the force transmitting members. A hardened body of a cement composition having a compressive modulus of elasticity of not less than $2.0 \times 10^5$ kg/cm² and a compressive strength of not less than 700 kg/cm² is being filled at least in-between the force transmitting members and the joint.

11 Claims, 3 Drawing Sheets

COUPLING DEVICE FOR FORCE TRANSMITTING MEMBER

BACKGROUND OF THE INVENTION

1. Field of the Invention

The present invention relates to a coupling device for a force transmitting member, and more particularly to such a coupling device in which a hardened cement composition is being filled.

2. Related Art Statement

In the conventional technology for transmitting force through a tension member or a compression member (these members being inclusively referred to as "force transmitting member" in the following description), there has been widely employed a method or measure wherein a joint is used to connect the force transmitting members. For example, iron or steel rods each having threaded ends are connected by a coupler having threaded holes, or fiber reinforced plastic rods each having a recess or projection are connected by a coupler having projections or recesses engaging with the recesses or projections of the rods. However, since some clearance is needed for engaging operation, it is inevitable that trembling or jolting occurs after the force transmitting members are connected by such joint means. Not only such trembling or jolting is detrimental in connecting a precise mechanism, but also the trembling or jolting causes fissure or cracking of a material having small tensile stress of elasticity such as concrete if such a material is present in the vicinity of the force transmitting members. Although it has been proposed to fill in a gap between the joint and the force trasmitting member with a resinous material, such as an epoxy resin, in order to prevent trembling, such a resinous material has various disadvantages in that it has high hydrate contraction, a low compressive modulus of elasticity and a high creep after being hardened and that it is low in heat resistance and in durability. On the other hand, it has been tried to use the conventional cement composition as the filler for filling in such a gap. However, the compressive strength of the conventional cement composition is small, and the compressive modulus of elasticity and the strength thereof are inevitably low since water content has to be increased to improve the fluidity for filling in a very small gap (clearance) in-between the force transmitting member and the joint.

If a material having low compressive modulus of elasticity and low strength is filled in the clearance, when a force is applied on the force transmitting member, the filler is dislocated for the lack of compressive modulus of elasticity to thereby cause undesirable shift of the position of the force transmitting member or the filler is crushed due to insufficient compressive strength so as not to fulfill its service as the filler. It was thus impossible to prevent the joint from trembling or jolting by the use of the known fillers.

OBJECTS AND SUMMARY OF THE INVENTION

A primary object of this invention is to provide a coupling device for a force transmitting member for fixing tightly the force transmitting member with a joint without trembling or jolting, sliding or back-lash.

Another object of this invention is to provide a coupling device for a force transmitting member, which does not cause cracking in the surrounding material in which it is embedded.

A further object of this invention is to provide a coupling device for a force transmitting member, which is excellent in heat resisting and weather-proof properties and improved in durability.

The above and other objects of this invention will become apparent from the following detailed description.

According to the present invention, there is provided a coupling device for a force transmitting member, comprising a plurality of force transmitting members for transmitting force therethrough and joint means for coupling one end of each of the force transmitting members, a hardened body of a cement composition being filled at least in-between the force transmitting members and the joint means, the hardened body of the cement composition having a compressive modulus of elasticity of not less than $2.0 \times 10^5$ kg/cm$^2$ and a compressive strength of not less than 700 kg/cm$^2$.

DESCRIPTION OF THE INVENTION

Figure 3:
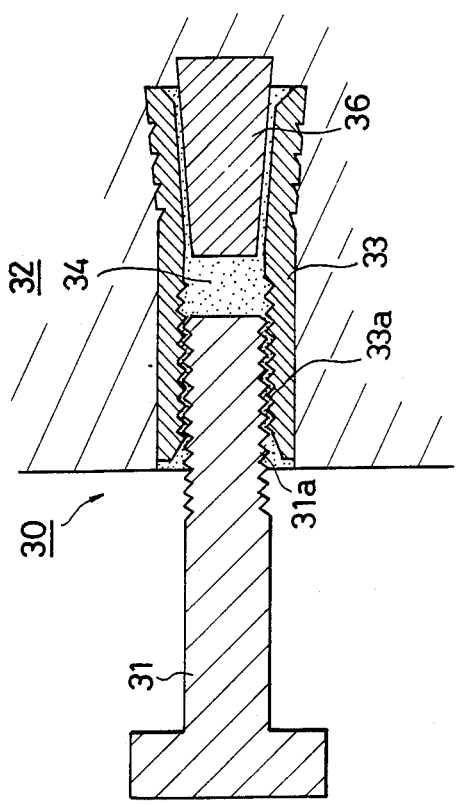
FIGS. 2 to 7 are diagrammatical sectional views showing different embodiments of the coupling device for a force transmitting member, according to the invention.

The present invention will now be described in detail hereinbelow.

The coupling device of the invention contains a plurality of force transmitting members for transmitting force therethrough and joint means for coupling one end of each of the force transmitting members. Any type of the force trasmitting members may be used as for as they serve to transmit a force. They may be made of any materials including metals, organic materials and inorganic materials. More specifically, materials for force transmitting members include iron, non-ferrous metals, alloys and FRP (fiber reinforced plastics). The force transmitting member may have any desired sectional shape. For example, it may have a polygonal, circular or elliptical section. A polyhedral, cylindrical or spheroidal force transmitting member having a hollow center portion may be acceptable.

The shape and the structure of the joint means are not particularly critical, as far as it joins the ends of a plurality of, normally two, force transmitting members so as not to be separated or disconnected from the joint means. The ends of the force transmitting members may be butt-jointed either in the condition that they are separated by a small gap or clearance or in the condition that they contact with each other. On the other hand, one force transmitting member may be aligned to be butt-jointed with another force transmitting member, or the end faces of the force transmitting members may be positioned such that they are opposed partially with each other. Otherwise, they may be hooked with each other. Various other measures for connecting the force transmitting members may be adopted within the scope of the invention, and the choice of particular connecting measure is within the discretion of a person having ordinary skill in the art. One example of the specific construction of the joint means is a screw-fitting of a threaded end of a force transmitting member with a threaded end of joint means. Another example includes a first engaging means, e.g. an engaging projection, provided on the end of a force transmitting member and a second engaging means, e.g. an engaging recess, provided on the end of a joint means for receiving the engaging projection of the force transmitting member. Alternatively, a force transmitting member and a joint means may be connected by means of a wedge.

According to an important aspect of the invention, a hardened body of a cement composition having a compressive modulus of elasticity of not less than $2.0 \times 10^5$ kg/cm$^2$ and a compressive strength of not less than 700 kg/cm$^2$, preferably not less than 1,000 kg/cm$^2$ is being filled at least in-between the force transmitting members and the joint means. In order to prevent the joint means from trembling and to transmit the force effectively therethrough, the hardened body of the cement composition should have a compressive modulus of elasticity of not less than $2.0 \times 10^5$ kg/cm$^2$ and a compressive strength of not less than 700 kg/cm$^2$, as defined above. When the properties, i.e. the compressive modulus of elasticity and the compressive strength, of the hardened cement composition are below the defined levels, the force transmitting members are not firmly coupled by the coupling device. Incidentally, the compressive modulus of elasticity (Ec) used throughout the specification and the claims means a secant modulus employing compressive strain ($\epsilon a$) at the time point of a third of the stress ($\delta a$) of the maximum compressive stress ($\delta c$) and calculated as follows:

$$Ec = (\delta a / \epsilon a)$$

One example of a cement composition, which provides a hardened body having a compressive modulus of elasticity of not less than $2.0 \times 10^5$ kg/cm$^2$ and a compressive strength of not less than 700 kg/cm$^2$, includes a cement, an ultra-fine particulate material, a water reducing agent, water and optionally a desired amount of an aggregate.

The cement composition, which may be preferably used in the invention, will be described in detail.

Cements, which may be generally used in the cement composition to provide a desirable hardened body in the present invention, include normal Portland cement, high early strength Portland cement, super high early strength Portland cement and white Portland cement. It is also possible to use blended cements, such as fly ash cement or blast furnace cement, low heat cements, such as moderate heat Portland cement or cements for molding mass concretes, expansive cement provided with expansive properties, and rapid hardening cement provided with rapid hardening properties. Other examples of the cement usable in the cement composition, according to the invention, are pulverized products of the aforementioned cements, the specific examples being those commercially available from Nippon Steel Chemical Co., Ltd. under the Trade Name of "Colloid Cement", and available from the same company under the Trade Name of "Super Fine Cement". Further, an inert inorganic powder having a particle size of 1 to 100 microns, such as mullite powder or iron powder may be added to the aforementioned cements. Also a combination of blast furnace slag and an alkaline activator such as a variety of cements, calcium hydroxide, quick lime or calcium sulfoaluminate minerals may be used as cements. Cement additives such as an expansive agent or a rapid hardening agent may be added to the cements to enhance intimate adhesion to the joint means and the force transmitting member and to lower the contraction of the cement composition. Examples of the effective expansive agent are quick lime system materials, such as burnt CaO, calcium sulfate base materials, quick lime/calcium sulfate base materials and calcium sulfoaluminate base materials, the particularly preferred being burnt CaO. In order to provide the cement composition with desirable expansive property, preferable amount of the expansive agent is not more than 20 parts by weight, more preferably from 2 to 15 parts by weight, based on 100 parts by weight of the cement.

As the burnt CaO, soft-burnt, hard-burnt and fused products may be used, and the soft-burnt CaO is preferred in consideration of the reactivity. Also in view of the reactivity, the burnt CaO may preferably have a particle size of not more than 88 microns.

A preferable example of the rapid hardening agent is a mixture of calcium aluminate and an inorganic sulfate, and such a rapid hardening agent may be preferably used in an amount such that 10 to 60 parts by weight of the rapid hardening agent is added to 100 parts by weight of the cement.

Since a cement paste or cement mortar added with a rapid hardening agent is excellent in exhibition of strength within a short time period, if some time period is required for the filling operation, a retarder may be added to prolong the pot life of the cement paste or mortar, as desired. Examples of the retarders for retarding the hardening or setting of the cement composition are hydroxycarboxylic acids, such as citric acid, tartaric acid and gluconic acid, water-soluble salts thereof, and carbonates and bicarbonates of alkali metals, such as $Na_2CO_3$, $NaHCO_3$, $K_2CO_3$ and $KHCO_3$.

The ultra-fine particulate material used in the cement composition is a powder having a particle size which is smaller than that of the cement particles. Although the composition of the ultra-fine particulate material is not particularly critical, ultra-fine particles which are easily soluble in water are not suited for use in the cement composition in the present invention. In the cement composition used as a filler for the coupling device of the invention, the particularly preferred untra-fine particles are silica dust (silica fume) or silicious dust prepared as a by-product in the process for preparing silicon, silicon containing alloys or zirconia; and fly ash, calcium carbonate, silica gel, opalic silica, titanium oxide and aluminum oxide may be used. The ultra-fine particles may be used in an amount of from 3 to 50 parts by weight, preferably from 5 to 40 parts by weight, based on 100 parts by weight of the cement. If the amount of the ultra-fine particles exceeds 50 parts by weight, it becomes hard to knead the cement composition with insufficient exhibition of the strength of the hardened body. On the contrary, if the amount of the ultra-fine particles is less than 3 parts by weight, exhibition of strength becomes unsatisfactory.

Examples of the water reducing agent include surface active agents which can be added in a large amount without resulting in excessively early or retarded setting and without entraining an excessive amount of air, and which have high dispersibility. Specific examples are those mainly composed of a salt of condensation product of naphthalenesulfonic acid and formaldehyde, a salt of condensation product of alkylnaphthalenesulfonic acid and formaldehyde, a salt of condensation product of melaminesulfonic acid and formaldehyde, high molecular weight ligninsulfonate, polycarboxylates, and mixtures thereof. The water reducing agent may be added in an amount of not more than 10 parts by weight, preferably from 1 to 8 parts by weight, based on 100 parts by weight of the cement. It is not preferable to add more than 10 parts by weight of water reducing agent, since the setting reaction of the cement composition is adversely affected.

When the aggregate is used, although general sands or gravels may be used as the aggregate, it is extremely effective, for the improvement in strenth and compressive modulus of elasticity, to use a hard aggregate selected on the basis that it has either a Moh's hardness of not less than 6 or a Knoop indentor hardness of not less than 700 kg/mm$^2$. Examples of aggregates satisfying the aforementioned basis or standard for selection include silica, emery, pyrite, ferrite, topaz, lawonite, corundum, phenacite, spinel, beryl, chrisoberyl, tourmoline, granite, andalsite, staurolite, zircon, burnt bauxite, boron carbide, tungsten carbide, ferrosilicon nitride, silicon nitride, fused silica, fused alumina electrofused magnesia and silicon carbide.

Although it is desirable that the water content in the composition be as large as possible in order to make it easier to fill the composition into the clearance between the force transmitting member and the joint means, the water content cannot be increased above a certain limit since the compressive modulus of elasticity and the strength of the hardened body of the cement composition are reduced as the water content is increased, the amount of water ranging generally from 10 to 30 parts by weight, preferably from 12 to 25 parts by weight, based on 100 parts by weight of the sum of the cement and the ultra-fine particles.

The cement composition used in the invention and having the composition as aforementioned, may be mixed in any method as long as the ingredients thereof are mixed or kneaded uniformly.

In order to fill the clearance between the force transmitting member and the joint means with the cement composition of the invention, the cement composition may be put into the clearance from an opening provided on the joint means or through the gap formed between the force transmitting member and the joint means by pouring or casting with or without pressing or suction force; the cement composition may be coated on the ends of the force transmitting members prior to joining with the joint means; or the cement composition may be filled in a cavity of the joint means followed by thrusting the ends of the force transmitting members into the cavity of the joint means.

In the most preferred embodiment of the invention, the coupling device includes two steel rods each having a threaded peripheral wall at least at its end which is screw-fitted or meshed with one of the threaded bores provided at the substantial center of joint means with the clearance between the threads of the force transmitting members and those of the joint means being filled with the hardened body of the aforementioned cement composition.

PREFERRED EMBODIMENTS OF THE INVENTION

Preferred embodiments of the invention will now be described with reference to the appended drawings wherein the similar members are denoted by reference numerals composed of the same units digits and different tens figure digits, and repeated descriptions thereof will be obviated.

Figure 1:
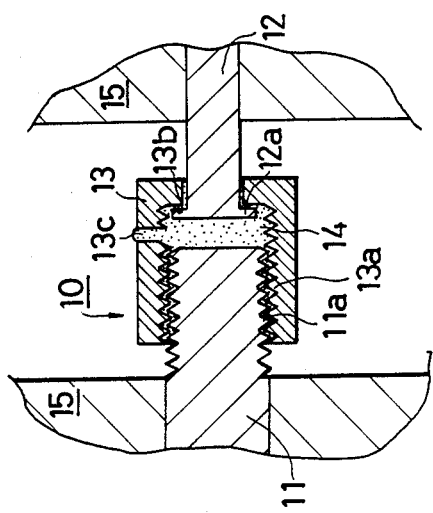
FIG. 1 is a diagrammatical sectional view showing an embodiment of the coupling device for a force transmitting member, according to the invention.

First referring to FIG. 1, an embodiment of the coupling device, according to the invention, is denoted generally by reference numeral 10. The coupling device 10 comprises two force transmitting members 11, 12 and one joint 13, with one end of the member 11 being provided with a threaded portion 11a which is meshed with the threaded portion 13a of the joint 13. On the other hand, a flange 12a is provided at the end of the member 12 so that the flange 12a abuts against the inner wall 13b of the joint 13 to prevent the same from separating from the joint 13. The joint 13 is provided with an opening 13c through which a cement composition 14 is filled. Panels 15 are coupled by the coupling device of this embodiment.

Figure 2:
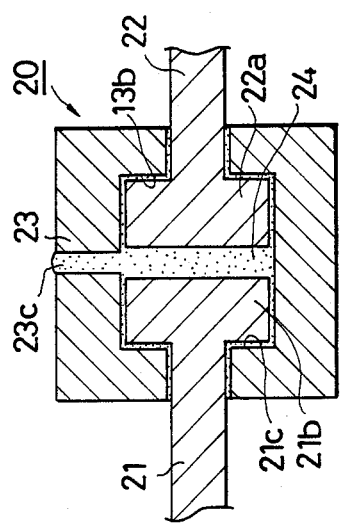

FIG. 2 shows an embodiment of a coupling device 20 in which flanges 21b and 22a are provided at the ends of steel or FRP rods 21 and 22, the coupling device further being comprising of joint 23. The flanges 21b and 22a may have circular or polygonal sections and abut the respective inner walls 21c and 13b of the joint 20. The joint 20 is provided with an opening 23c through which a cement composition 24 is filled.

FIG. 3 shows an embodiment of a coupling device 30 for fixing an anchor, wherein one of the force transmitting members is a member 31 having a threaded portion 31a which is meshed with threaded portion 33a of joint 33 and the other is a concrete mass 32 which has been previously placed and a wedge 36 is inserted in one end of the joint 33, joint 33 being filled with a cement composition 34.

Figure 4:
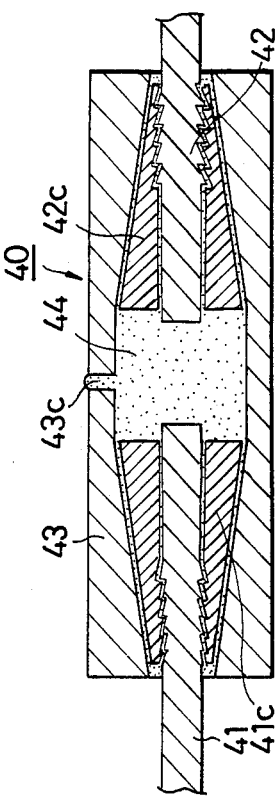

In the embodiment of a coupling device 40 shown in FIG. 4, force transmitting members 41, 42 are fixed to a joint 43 while being prevented from separating by a pulling force by the actions of wedges 41c and 42c inserted respectively in the generally truncated cone-shaped cavities of the joint 43 and firmly fixed to the force transmitting members 41 and 42.

The joint 43 is provided with an opening 43c through which a cement composition 44 is filled.

Figure 5:
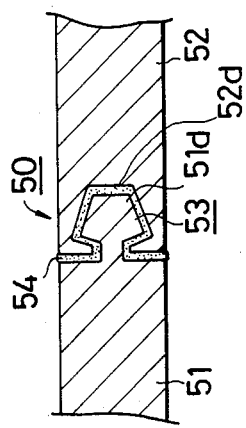

In the embodiment of a coupling device 50 shown in FIG. 5, joint 53 is constituted by a projection 51d provided at one end of a force transmitting member 51 and a recess 52d provided at one end of another force transmitting member 52. The joint 53 is filled with a cement composition 54.

Figure 6:
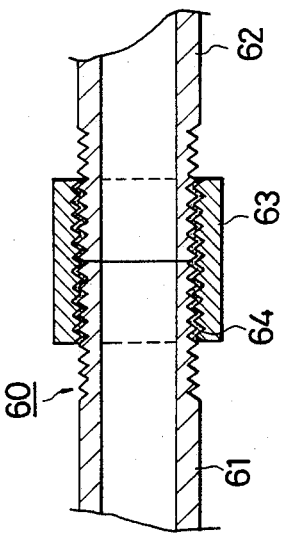

FIG. 6 shows an embodiment of a coupling device 60 wherein two pipes 61 and 62 are screwed into a threaded joint 63 to have the ends thereof being butt-joined together. The joint 63 is filled with a cement composition 64.

Figure 7:
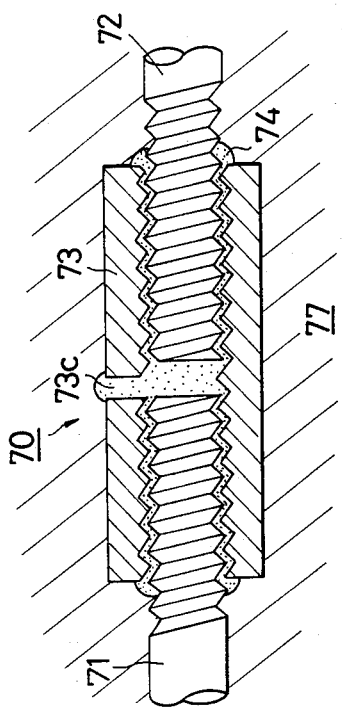

FIG. 7 shows a coupling device 70 for coupling steel rods 71 and 72 buried in a placed concrete for the purpose of reinforcing the concrete mass. The steel rods 71, 72 have threaded ends which engage threads in a joint 73 which has an opening 73c through which a filler composition is filled. When a force is applied on either of the steel rods 71 or 72, the coupled portions of both steel rods are affected by the applied force most significantly. Upon application of such a force, the filler composition filled in-between the gap or clearance between the rods 71, 72 and the joint 73 absorbs the force and deformed correspondingly. If the extent of deformation caused thereby is large, the concrete mass 77 surrounding the steel rods 71, 72 suffers cracking to lower the toughness of the reinforced concrete (RC) member and to impair the stability of the building formed thereby. However, when a filler which absorbs the force applied through the steel rods to be deformed only a small extent is used, in other words, when a filler having a high compressive modulus of elasticity is used in accordance with the present invention, the disadvantageous cracking can be prevented. It should be, of course, appreciated that the filler should have a sufficiently high compressive strength, in addition to a high compressive modulus of elasticity, not to be crushed by the force transmitted through the reinforcing steel rods 71, 72. If the compressive strength of the filler is so low as to be crushed by the force applied through the steel rods 71, 72, the deformation caused thereby exceeds the elasticity of the concrete to cause a fatal result.

The coupling device of the invention prevents the trembling, slipping or back-lash between the force transmitting member and the joint means to provide stable coupling which can withstand repeated tension and compression forces.

The coupling device of the invention may be used as a coupler for jointing piles, precast panels, iron or steel rods in a precast member, in a joint for joining iron or steel frames in a truss, iron tower, post or pillar and beam, and in a joint for steel bars of reinforced concrete members such as buildings, bridges or atomic power stations. The coupling device of the invention may be also applied for fixing machines, shelves and desks, or embedding anchors for fixing steel rods in a previously placed concrete mass.

EXAMPLES OF THE INVENTION

The present invention will be described more in detail by referring to specific examples thereof.

EXAMPLE 1

Figure 8:
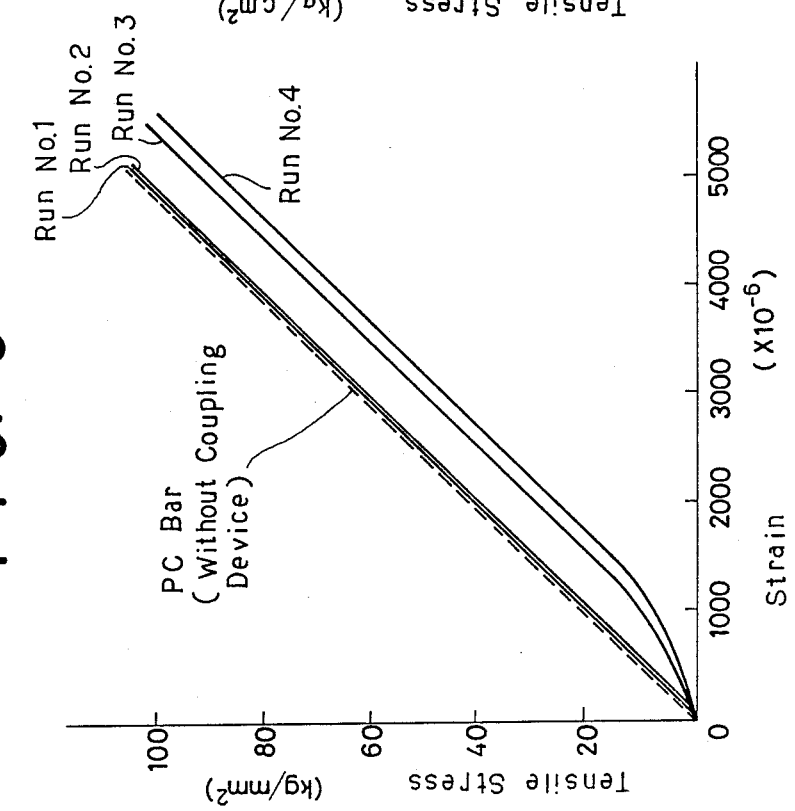

A kneaded cement composition having a composition as set forth in Table 1 was filled in a clearance between force transmitting members and a joint, the details thereof being set forth in Table 2, followed by ageing in a chamber maintained at 20° C. and 80 % RH. After ageing for 28 days, the coupled portion was subjected to a pulling test to inspect the condition of the coupled portion after the pulling test. A sample having the same composition was molded to have a cylindrical shape (5 cm$\phi \times$ 10 cm height) and subjected to the same ageing conditions. The compressive modulus of elasticity and compressive strength were measured. The results are shown in Table 2. The curve showing the stress-strain relation during the pulling test is shown in FIG. 8.

Comparative Example 1

For the comparison purpose, a coupling device having an empty clearance and another coupoling device having a clearance filled with an epoxy base filler were subjected to pulling tests conducted similarly as in Example 1. The results are shown in Table 2 and FIG. 8.

The materials used in Example 1 and Comparative Example 1 are as follows:

Cement: High early strength Portland cement available from Chichibu Cement Co., Ltd.
Ultra-fine Particle: Silica dust (Average Particle Size: 0.1 micron) produced during the process for preparing ferrosilicon.
Water Reducing Agent: A commercially available product produced and sold under the Trade Designation of "FT-500" from Denki Kagaku Kogyo K.K. and mainly composed of a salt of a condensation product of an alkylnaphthalenesulfonic acid and formaldehyde.
Water: City water.
PC Steel Bar: A steel bar of grade C, No. 1 having an indicated diameter of 17 mm and produced by Koshuha Netsuren K.K.
Wedge Member: A wedge made of a carbon steel S45C.
Joint: A cylindrical joint having both ends provided with bores in which the heads of the PC steel bars are mounted.
Epoxy Base Filler: A filler available from Sumitomo Chemical Co., Ltd, under the Trade Name of "Sumikadine SA No. 5".

TABLE 1

| Composition (parts by weight) | | | | Properties after Aged for 28 days | |
|---|---|---|---|---|---|
| Cement | Ultra-fine Particle | Water Reducing Agent | Water* | Compressive Modulus of Elasticity (kg/cm$^2$) | Compressive Strength (kg/cm$^2$) |
| 100 | 20 | 2.4 | 16 | 2.35 $\times$ 10$^5$ | 1132 |

*Note: The amount of water is indicated in parts by weight added to 100 parts by weight of the sum of the cement and the ultra-fine particle.

TABLE 2

| Run* No. | Force Transmitting Member | Joint Means | Filler in the Clearance | Results of Inspection |
|---|---|---|---|---|
| 1 | PC steel bars having ends each being threaded by a length of 10 cm | Joint Shown in FIG. 4 | Kneaded Cement Composition of Table 1 | Satisfactory with no slipping or trembling |
| 2 | PC steel bars having ends processed through hot heading | Joint Shown in FIG. 2 | The same as Table 1 | The same as above |
| 3 | Same steel bars and joint means as used in Run No. 1 | | Epoxy Base Filler | No trembling, Some slipping found. |
| 4 | Same steel bars and joint means used in Run No. 1 | | No filler | Both of trembling and slipping found. |

*Note:
(A) Run Nos. 1 and 2 are embodiments of the invention, whereas Run Nos. 3 and 4 are comparison runs.
(B) Reference should be made to FIGS. 2 and 4.

EXAMPLE 2

Steel pipes each having an outer diameter of 32 mm and a wall thickness of 3.6 mm with one end threaded were used as the force transmitting members, and a socket having threaded portions at both ends thereof for meshing with the threads of the steel pipes was used as the joint means. The same cement composition as used in Example 1 was filled in the clearance between the threads of the steel pipes and the threads of the socket. Similar satisfactory results were obtained by an experiment conducted similarly as in Example 1.

EXAMPLE 3

A set of anchors (Anchor No. 4 available from Makita Electric Works, Ltd.) were used as the joint means. As the force transmitting members used were a ½ inch bolt and a previously placed concrete in which the anchors were embedded. In this Example, the set of anchors used as the joint means surrounded the bolt and was inserted in the previously placed concrete. After putting the anchors into the previously placed concrete serving as one of the force transmitting members, the kneaded cement composition as set forth in Table 1 was filled in the anchors. Then, the bolt serving the other of the force transmitting members was tightly screwed in the set of anchors. After ageing for a sufficient time period, the bolt was pulled repeatedly while applying to it a loading corresponding to one half ($\frac{1}{2}$) of the breaking loading of the bolt. The result was satisfactory in that no loosening, slipping or back-lash of the bolt was observed.

EXAMPLE 4

Examples of cement composition for providing hardened body each having a compressive modulus of elasticity of not less than $2.0 \times 10^5$ kg/cm$^2$ and a compressive strength of not less than 1,000 kg/cm$^2$ will be set forth in the following Table 3. The properties of respective compositions are also shown in Table 3.

The materials used in Example 4 are the same as used in Example 1, except that a siliceous sand having a particle size of not more than 0.15 mm was used as the aggregate.

TABLE 3

| Composition (parts by weight) | | | | | Properties after Aged for 28 days | |
|---|---|---|---|---|---|---|
| Cement | Ultra-fine Particle | Water Reducing Agent | Water* | Aggregate | Compressive Modulus of Elasticity (kg/cm$^2$) | Compressive Strength (kg/cm$^2$) |
| 100 | 5 | 2 | 18 | 0 | $2.20 \times 10^5$ | 1130 |
| 100 | 10 | 2 | 13 | 0 | $2.45 \times 10^5$ | 1189 |
| 100 | 20 | 2 | 16 | 0 | $2.35 \times 10^5$ | 1132 |
| 100 | 30 | 3 | 20 | 0 | $2.15 \times 10^5$ | 1103 |
| 100 | 45 | 3 | 26 | 0 | $2.05 \times 10^5$ | 1050 |
| 100 | 20 | 2 | 18 | 50 | $3.15 \times 10^5$ | 1080 |

*Note: The amount of water is indicated in parts by weight added to 100 parts by weight of the sum of the cement and the ultra-fine particle.

EXAMPLE 5

A cement paste having the composition shown by Run No. 5 in Table 4 was prepared and kneaded sufficiently, and then the kneaded cement paste was filled in a coupling device for coupling steel bars using a pump, followed by ageing in a chamber maintained at 20° C. and at 80% RH for 28 days. Thereafter, the coupling device was subjected to a pulling test to ascertain the effectiveness or utility of the present invention. Separately, the same cement paste was cast in a cylindrical mold of 5 cm$\phi \times$ 10 cm, and aged in a chamber maintained at 20° C. and at 80% RH for 28 days while being held in the mold. After ageing for 28 days, the aged sample was removed from the mold and subjected to tests to determine the compressive strength, compressive modulus of elasticity and strain thereof. The results are shown in Table 4. The stress-strain curve is shown in FIG. 9.

Comparative Example 2

Figure 9:
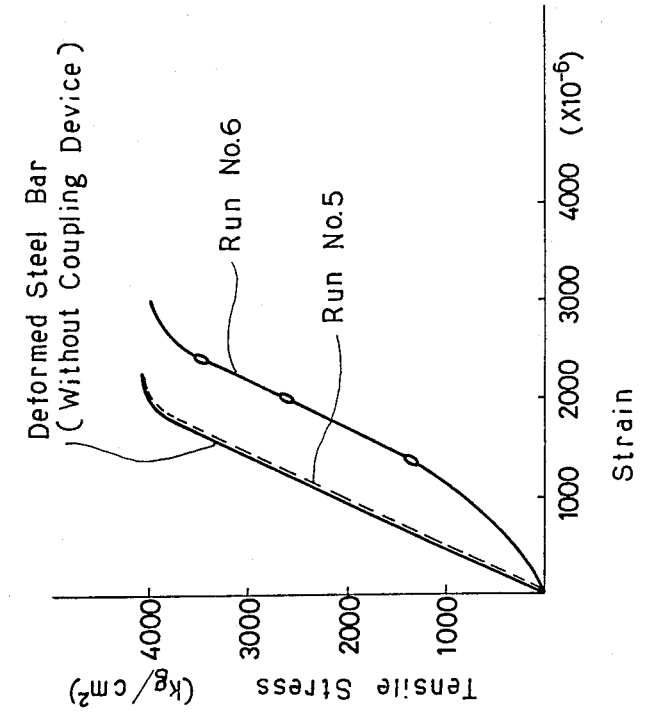
FIGS. 8 and 9 are graphs showing the stress-strain curves for the cases where the coupling device of the invention is incorporated and for the cases where the coupling device of the invention is not incorporated.

The results of an experiment conducted by the use of a cement paste having the composition of Run No. 6 in Table 4 are shown in Table 4 and in FIG. 9 (as denoted by Experiment No. 6 in FIG. 9). It should be seen from Table 4 and FIG. 9 that the coupling device of the invention (as denoted by Experiment No. 5 in FIG. 9) is superior over that of the Comparative Example.

TABLE 4

| | Composition (parts by weight) | | | | Properties after Aged for 28 days | |
|---|---|---|---|---|---|---|
| Run No. | Cement | Ultra-fine Particle | Water Reducing Agent | Water | Compressive Strength (kg/cm$^2$) | Compressive Modulus of Elasticity (kg/cm$^2$) |
| 5 | 100 | 20 | 2.5 | 19 | 1,150 | $2.4 \times 10^5$ |
| 6 | 100 | 0 | 0.5 | 33 | 650 | $1.8 \times 10^5$ |

The materials used and the filling method employed in Example 5 and Comparative Example 2 are as follows:

Materials used:
1. Steel Bar: Deformed steel bar called "SD 35" (Diameter 32 mm)
2. Coupler: Made of carbon steel S45C for constructing a machine.
3. Filler:
   Cement: Normal Portland cement available from Denki Kagaku Kogyo K.K.
   Ultra-fine Particle: A silica dust (Average Particle Size: 0.1 micron) produced during the process for preparing ferrosilicon.
   Water Reducing Agent: A commercially available product produced and sold under the Trade Designation of "FT-500" from Denki Kagaku Kogyo K.k. and mainly composed of a salt of a condensation product of an alkylnaphthalenesulfonic acid and formaldehyde. The added amount of the water reducing agent shown in Table 4 is the part calculated to the effective component contained in the "FT-500".

Filling Method:
The steel bars were butt-joined in the coupler, and each of the cement pastes was filled in the clearance or gap left in the coupler and between the opposed ends of the steel bars. The paste was filled through an opening provided through the wall of the coupler using a pump.

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A coupling device for a force transmitting member comprising a plurality of force transmitting members for transmitting force therethrough and joint means coupling an end of each of said force transmitting members so that the force transmitting members are not linearly detachable from the joint means, an end of at least one of said force transmitting members being threaded to be screw-fitted with a thread provided on the inside of said joint means, the force transmitting members and the joint means forming spaces therebetween, a hardened body of a cement composition completely filling said spaces, said hardened body of the cement composition having a compressive modulus of elasticity of not less than $2.0 \times 10^5$ kg/cm$^2$ and a compressive strength of not less than 700 kg/cm$^2$, said spaces including clearance spaces between the thread of said at last one force transmitting member and the thread of the joint means.

2. The coupling device according to claim 1, wherein said joint means has a hole through which said spaces are filled with said cement composition.

3. The coupling device according to claim 1, wherein said coupled ends are mutually opposed and spaced apart and the spaces filled by said cement composition include the space between the coupled ends of said force transmitting members.

4. The coupling device according to claim 1, wherein said cement composition comprises a cement, an ultra-fine particle, a water reducing agent, and water.

5. The coupling device according to claim 4 wherein said cement composition further comprises an aggregate.

6. The coupling device according to claim 4 wherein said cement is selected from the group consisting of normal Potland cement, high early strength Portland cement, super high early strength Portland cement, white Portalnd cement, fly ash cement, blast furnace cement, moderate heat Portland cement, rapid hardening cement, expansive cement, an inert inorganic powder having a particle size of from 1 to 100 microns added with said cements, a combination of blast furnace slag and an alkaline activator, and mixtures thereof.

7. The coupling device according to claim 4, wherein said ultra-fine particle is selected from the group consisting of silica dust, silicious dust, calcium carbonate, silica gel, opalic silica, titanium oxide, aluminum oxide and mixtures thereof.

8. The coupling device according to claim 4, wherein said water reducing agent is selected from the group consisting of those mainly composed of salts of condensation product of naphthalenesulfonic acid and formaldehyde, salts of condensation product of alkylnaphhtalenesulfonic aicd and formaldehyde, salts of condensation product of melaminesulfonic acid and formaldehyde, hih molecular weight ligninsulfonate, polycarboxylates and mixtures thereof.

9. The coupling device according to claim 5, wherein said aggregate has a Moh's hardness of not less than 6.

10. The coupling device according to claim 5, wherein said aggregate has a Knoop indentor hardness of not less than 700 kg/mm$^2$.

11. The coupling device according to claim 4, wherein said cement composition further contains an expansive agent, a rapid hardening agent and mixtures thereof.

* * * * *